(12) United States Patent
Thompson

(10) Patent No.: US 9,295,188 B2
(45) Date of Patent: Mar. 29, 2016

(54) LAWN AERATING AND DETHATCHING DEVICE

(71) Applicant: Joseph Thompson, Stony Brook, NY (US)

(72) Inventor: Joseph Thompson, Stony Brook, NY (US)

(*) Notice: Subject to any disclaimer, the term of this patent is extended or adjusted under 35 U.S.C. 154(b) by 0 days.

(21) Appl. No.: 14/213,277

(22) Filed: Mar. 14, 2014

(65) Prior Publication Data
US 2014/0338934 A1 Nov. 20, 2014

Related U.S. Application Data

(60) Provisional application No. 61/794,734, filed on Mar. 15, 2013.

(51) Int. Cl.
A01B 45/00 (2006.01)
A01B 45/02 (2006.01)

(52) U.S. Cl.
CPC .................................... A01B 45/02 (2013.01)

(58) Field of Classification Search
CPC ........ A01B 1/243; A01B 35/00; A01B 35/16; A01B 35/28; A01B 45/02; A01B 45/00; A01B 29/045; A01B 29/06; A01C 7/008
USPC ......... 172/1, 21, 22, 355, 349, 329, 256, 122, 172/42, 354, 540, 554, 611
See application file for complete search history.

(56) References Cited

U.S. PATENT DOCUMENTS

| | | | | |
|---|---|---|---|---|
| 555,623 | A * | 3/1896 | Shailer et al. | 172/547 |
| 1,807,182 | A * | 5/1931 | Stoner | 172/21 |
| 1,866,998 | A * | 7/1932 | Buel | 172/21 |
| 2,801,512 | A * | 8/1957 | Karaktin | 56/249 |
| 2,966,218 | A * | 12/1960 | Johnson | 172/172 |
| 3,881,553 | A * | 5/1975 | Angeski | 172/22 |
| 4,081,034 | A | 3/1978 | Hines | |
| 4,094,363 | A | 6/1978 | McCoomb | |
| 4,336,845 | A * | 6/1982 | Kolb | 172/349 |
| 4,678,043 | A * | 7/1987 | vom Braucke et al. | 172/349 |
| 5,014,791 | A * | 5/1991 | Kure | 172/21 |
| 5,020,602 | A * | 6/1991 | Dellinger | 172/21 |
| 5,398,768 | A | 3/1995 | Staples | |
| 5,398,769 | A | 3/1995 | Staples | |
| D367,593 | S | 3/1996 | De Larue | |

(Continued)

OTHER PUBLICATIONS

Garden Cultivator, Citation from World Wide Web, http://www.hound-dog.com/products dated May 11, 2012.
Agri-Fab 16-in Spike Lawn Aerator, Citation from World Wide Web: Google Search Results, http://www.google.com/ shopping dated May 11, 2012.
Lewis Lawn Aerator 38", Citation from World Wide Web: Google Search Results, http://www.google.com/shopping dated May 11, 2012.

(Continued)

Primary Examiner — Robert Pezzuto
(74) Attorney, Agent, or Firm — Hoffmann and Baron, LLP

(57) ABSTRACT

A manually operated aerating and dethatching device includes a housing having a frame. A plurality of tine members is rotatably connected to the frame. Each tine member includes a plurality of outwardly extending tines for engaging a ground surface. The tine members are generally aligned along a longitudinal axis. A first wheel is rotatably connected to the housing. The first wheel has an outer rolling surface offset from an outer end of the plurality of tine members. A handle is rigidly connected to the housing extending generally outwardly and upwardly therefrom. Movement of the handle in an upward direction pivots the tine members on the wheel into engagement with the ground surface wherein a degree of engagement of the tine members with the ground surface can be controlled by the user.

19 Claims, 11 Drawing Sheets

(56) References Cited

U.S. PATENT DOCUMENTS

| | | | |
|---|---|---|---|
| 5,586,603 A | 12/1996 | Mattis | |
| 5,613,565 A * | 3/1997 | Kelly | 172/21 |
| 5,632,342 A | 5/1997 | Knoblich et al. | |
| 5,769,169 A * | 6/1998 | Miksitz | 172/21 |
| 5,787,990 A | 8/1998 | Miller | |
| 5,906,090 A | 5/1999 | Knudsen | |
| 5,934,055 A | 8/1999 | Steele | |
| 6,016,585 A | 1/2000 | Allen | |
| 6,085,502 A | 7/2000 | Wians et al. | |
| 6,098,385 A | 8/2000 | Turk | |
| 6,105,348 A | 8/2000 | Turk et al. | |
| 6,141,810 A | 11/2000 | Allen et al. | |
| 6,155,033 A | 12/2000 | Wians et al. | |
| 6,199,354 B1 | 3/2001 | King et al. | |
| 6,273,197 B1 | 8/2001 | Marlow | |
| 6,758,283 B2 | 7/2004 | Lauer et al. | |
| 6,983,806 B2 | 1/2006 | Bjorge | |
| 7,055,617 B2 | 6/2006 | Bjorge et al. | |
| 7,070,005 B2 | 7/2006 | Maas et al. | |
| 7,096,968 B2 | 8/2006 | Maas et al. | |
| 7,152,691 B2 | 12/2006 | Maas et al. | |
| 7,204,317 B2 | 4/2007 | Maas et al. | |
| 7,290,619 B2 | 11/2007 | Maas et al. | |
| 7,341,115 B2 | 3/2008 | Maas et al. | |
| 7,438,136 B2 | 10/2008 | Maas et al. | |
| 7,451,831 B2 | 11/2008 | Bjorge et al. | |
| 7,478,681 B2 | 1/2009 | Alston | |
| 7,575,063 B2 | 8/2009 | Maas et al. | |
| 7,575,064 B2 | 8/2009 | Maas et al. | |
| 7,640,994 B2 | 1/2010 | Maas et al. | |
| 7,669,666 B2 | 3/2010 | Maas et al. | |
| 7,717,188 B2 | 5/2010 | Bjorge et al. | |
| 7,735,573 B2 * | 6/2010 | Catalano | 172/349 |
| 7,743,841 B2 | 6/2010 | Maas et al. | |
| 7,779,929 B2 | 8/2010 | Maas et al. | |
| 7,784,557 B2 | 8/2010 | Maas et al. | |
| 7,896,095 B2 | 3/2011 | Maas et al. | |
| 7,926,582 B2 | 4/2011 | Maas et al. | |
| 7,931,094 B2 | 4/2011 | Maas et al. | |
| 8,028,758 B2 | 10/2011 | Maas et al. | |
| 8,079,422 B2 | 12/2011 | Maas et al. | |
| 2012/0006571 A1 | 1/2012 | Dart | |

OTHER PUBLICATIONS

Agri-Fab 45/0299 48 Inch Tow Behind Plug Aerator, Citation from World Wide Web: Google Search Results, http://www.google.com/shopping dated May 11, 2012.

Brinly 40" Combo Aerator-Spreader AS-40BH, Citation from World Wide Web: Google Search Results, http://www.google.com/shopping dated May 11, 2012.

John Deere Lawn Equipment Parts 40 in. Tow-Behind Plug Aerator PA-40JD, Citation from World Wide Web: Google Search Results, http://www.google.com/shopping dated May 11, 2012.

Brinly 40" Plug Type Tow Behind Aerator PA-40BH, Citation from World Wide Web: Google Search Results, http://www.google.com/shopping dated May 11, 2012.

Precision Products SA42GY 42" Spike Aerator, Citation from World Wide Web: Google Search Results, http://www.google.com/shopping dated May 11, 2012.

Craftsman (32") Spread Width Aerator/Spreader Combo, Citation from World Wide Web: Google Search Results, http://www.google.com/shopping dated May 11, 2012.

John Deere Lawn Equipment Parts 40 in. Tow-Behind Combination Aerator-Spreader AS-40JD, Citation from World Wide Web: Google Search Results, http://www.google.com/shopping dated May 11, 2012.

Mantis 7321LW Tiller Aerator/Dethatcher Attachment, Citation from World Wide Web: Google Search Results, http://www.google.com/shopping dated May 11, 2012.

Billy Goat AE401H Walk Behind Aerator, 4.0 HP, 19in. Width, Citation from World Wide Web: Google Search Results, http://www.google.com/shopping dated May 11, 2012.

Billy Goat AET48 48-72" Tow Behind Aerator, Citation from World Wide Web: Google Search Results, http://www.google.com/shopping dated May 11, 2012.

Yard Tuff Tow-Behind Plug Aerator—48in.W, 32 Knives, Model#AE-48T, Citation from World Wide Web: http://www.northerntool.com dated May 11, 2012.

* cited by examiner

LAWN AERATING AND DETHATCHING DEVICE

This application claims the benefit of priority to U.S. Provisional Application No. 61/794,734 filed on Mar. 15, 2013 the contents of which are herein incorporated by reference in its entirety.

TECHNICAL FIELD

The present invention relates to a device for improving a ground surface, and more particularly a manually operated device for aerating, dethatching, and otherwise improving the ground surface.

BACKGROUND

Overtime, a lawn surface can develop bare spots and become compacted. Thatch can also develop overtime on a lawn and inhibit the ability of water and nutrients to enter the soil. In order to maintain a healthy lawn, it is important that the surface be periodically aerated and or dethatched in order to allow nutrients and water to penetrate into the soil. Aerators may also be used to help reseed a lawn or establish a new lawn, since the seed falls into the openings formed in the ground, which aids in seed germination.

Lawn aerators of the type known in the art come in different forms including slit aerators, which slice into the turf and plug aerators which remove a plug of turf. Aerators and/or dethatches are available as motor driven devices and manual devices which are pushed along by a user. Manual aerators require an individual to apply pressure to the aerating head in order to allow the ground engaging tines to enter the soil. Manual aerating devices are typically less expensive to purchase and maintain than the motor driven devices. They are also easier to maneuver to and from the work site. Such devices often typically require a significant amount of exertion by the user and only provide limited results with regard to aeration. However, the ground engaging elements of such aerating devices are prone to clogging and do not sufficiently aerate the lawn.

Accordingly, it would be desirable to provide a manual lawn aerating and dethatching device which is easy to use and is effective in conditioning the soil for growing a healthy lawn.

SUMMARY

The present invention provides a manually operated aerating and dethatching device including a housing having a frame. A plurality of tine members is rotatably connected to the frame. Each tine member includes a plurality of outwardly extending tines for engaging a ground surface. The tine members are generally aligned along a longitudinal axis. A first wheel is rotatably connected to the housing. The first wheel has an outer rolling surface offset from an outer end of the plurality of tine members. A handle is rigidly connected to the housing extending generally outwardly and upwardly therefrom. Movement of the handle in an upward direction pivots the housing on the first wheel to move the tine members into engagement with the ground surface wherein a degree of engagement of the tine members with the ground surface can be controlled by the user.

The present invention further provides a ground aerating and dethatching device for conditioning a ground surface including an aerating assembly having a frame having a housing secured thereto. The frame has a plurality of spaced posts extending therefrom. A plurality of tine members is rotatably securable to the posts, and each of the tine members has a first set of tines and a second set of tines extending from a common hub. The second set of tines of adjacent opposed tine members overlap each other. A handle is connected to and extends from the aerating assembly. A pair of spaced wheels is rotatably secured to the aerating assembly. The wheels are disposed between the tine members and the handle. The aerating assembly is pivotal on the wheels upon movement of the handle to selectively engage the tines with the ground surface.

The present invention still further provides a method of aerating and dethatching a ground surface including:

providing an aerating and dethatching device including a housing including a frame;

a plurality of tine members rotatably connected to the frame, each tine member including a plurality of outwardly extending tines for engaging a ground surface, the tine members being generally aligned along a longitudinal axis;

a first wheel rotatably connected to the housing, the first wheel having an outer rolling surface offset from an outer end of the plurality of tine members;

a handle rigidly connected to the housing extending generally outwardly and upwardly therefrom, wherein movement of the handle in an upward direction pivots the tine members on the wheel into engagement with the ground surface wherein a degree of engagement of the tine members with the ground surface can be controlled by the user;

rotating the handle upwardly to engage the tines with the ground surface;

manually moving the aerating and dethatching device forward and backward over the ground surface; and adjusting the amount of force acting on the tines by pivoting the handle up and down.

DETAILED DESCRIPTION

Figure 1:
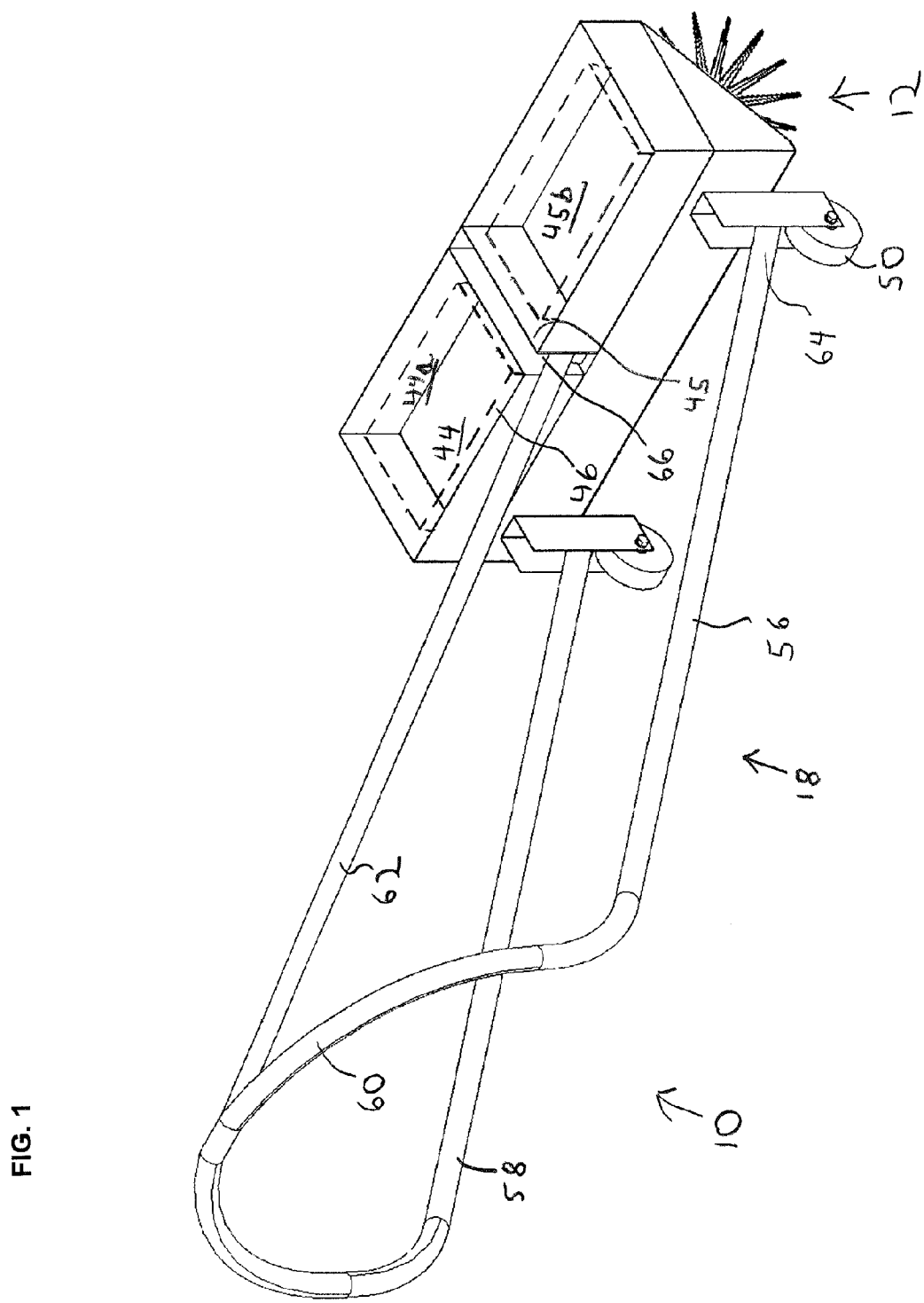
FIG. 1 is a perspective view of a manually operated lawn aerating and dethatching device in accordance with the present invention.
Figure 2:
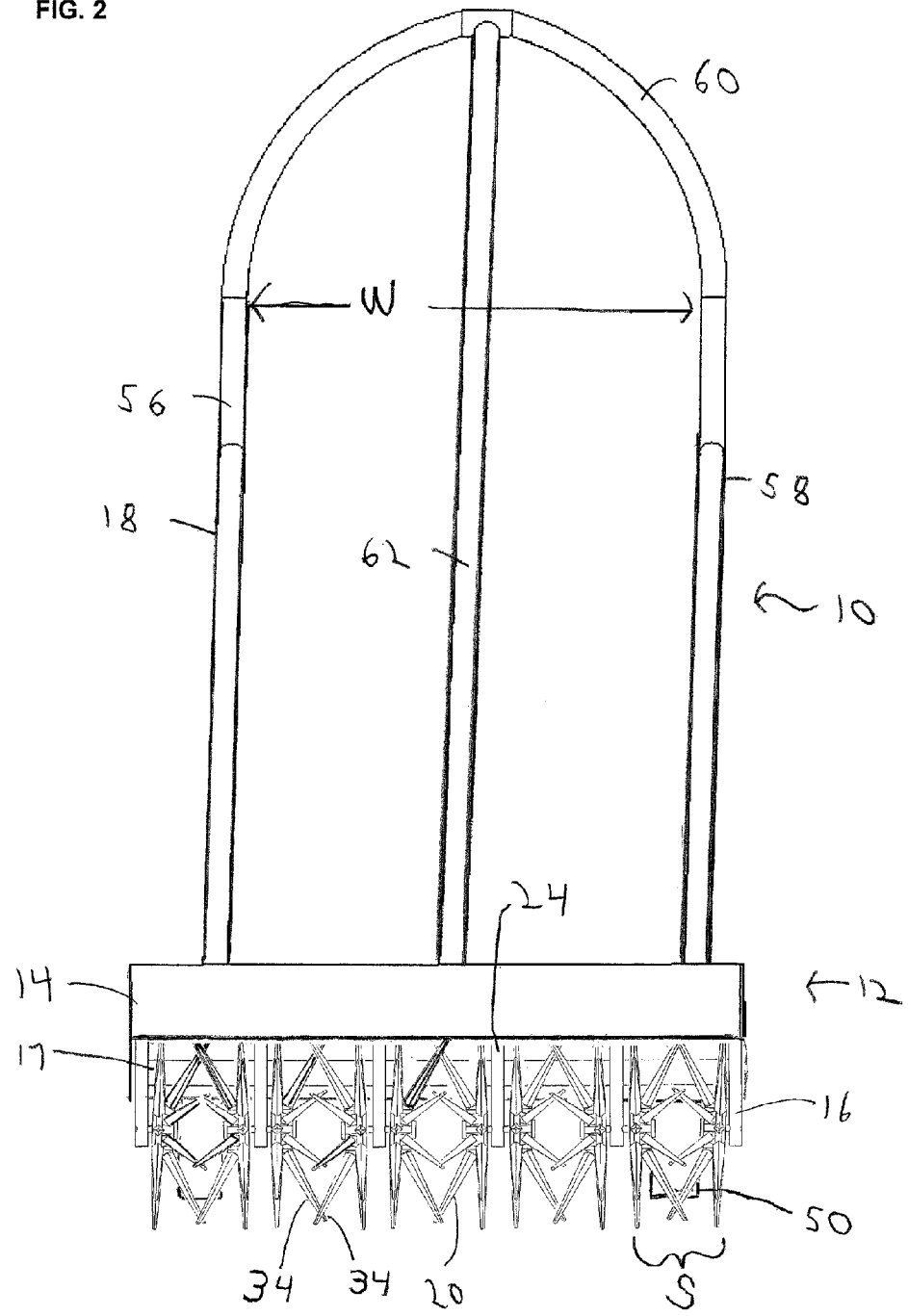
FIG. 2 is a front elevational view of the aerating and dethatching device of FIG. 1.
Figure 3:
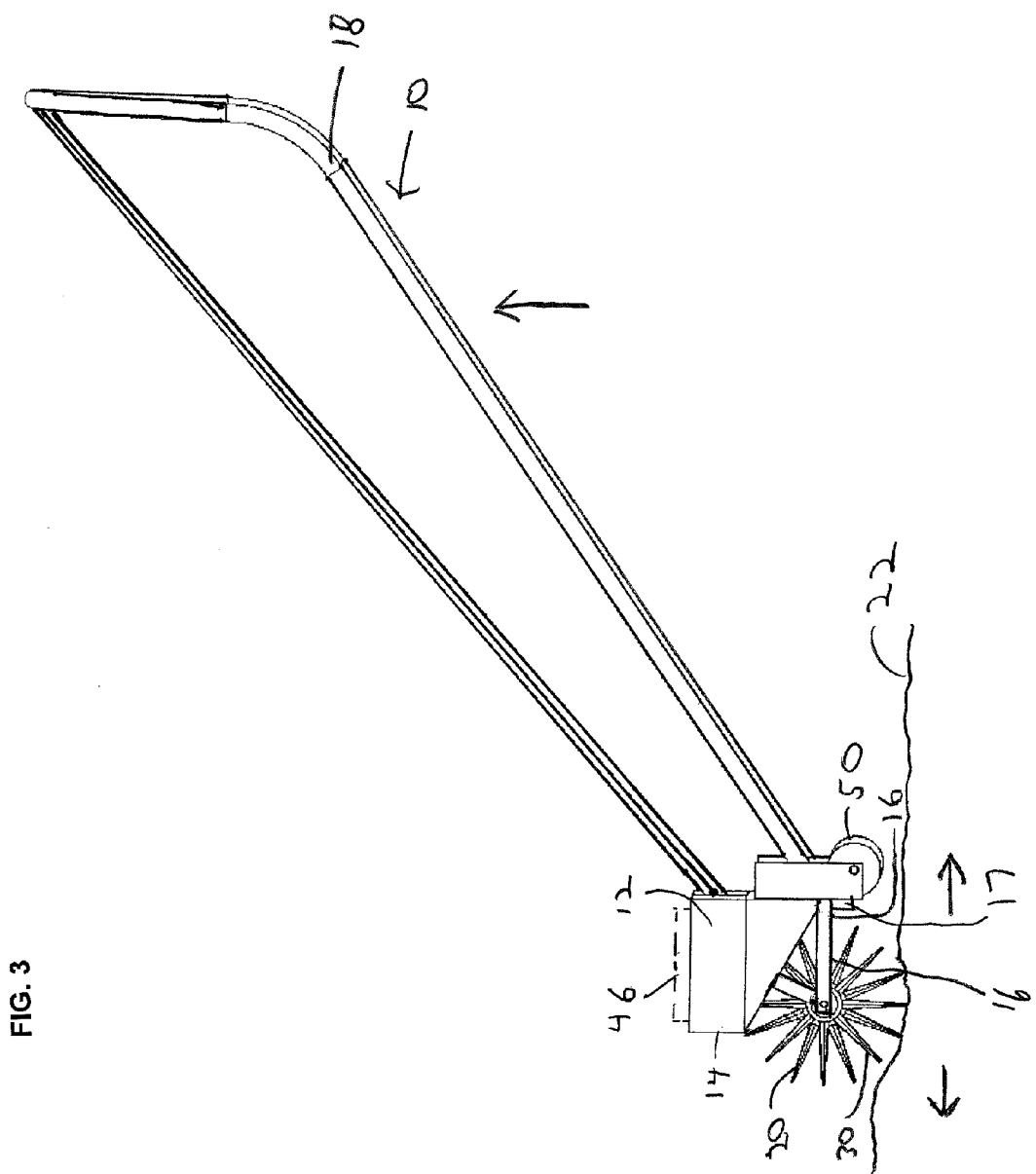
FIG. 3 is side elevational view of the aerator of FIG. 1 showing the tine members in engagement with a ground surface.
Figure 4:
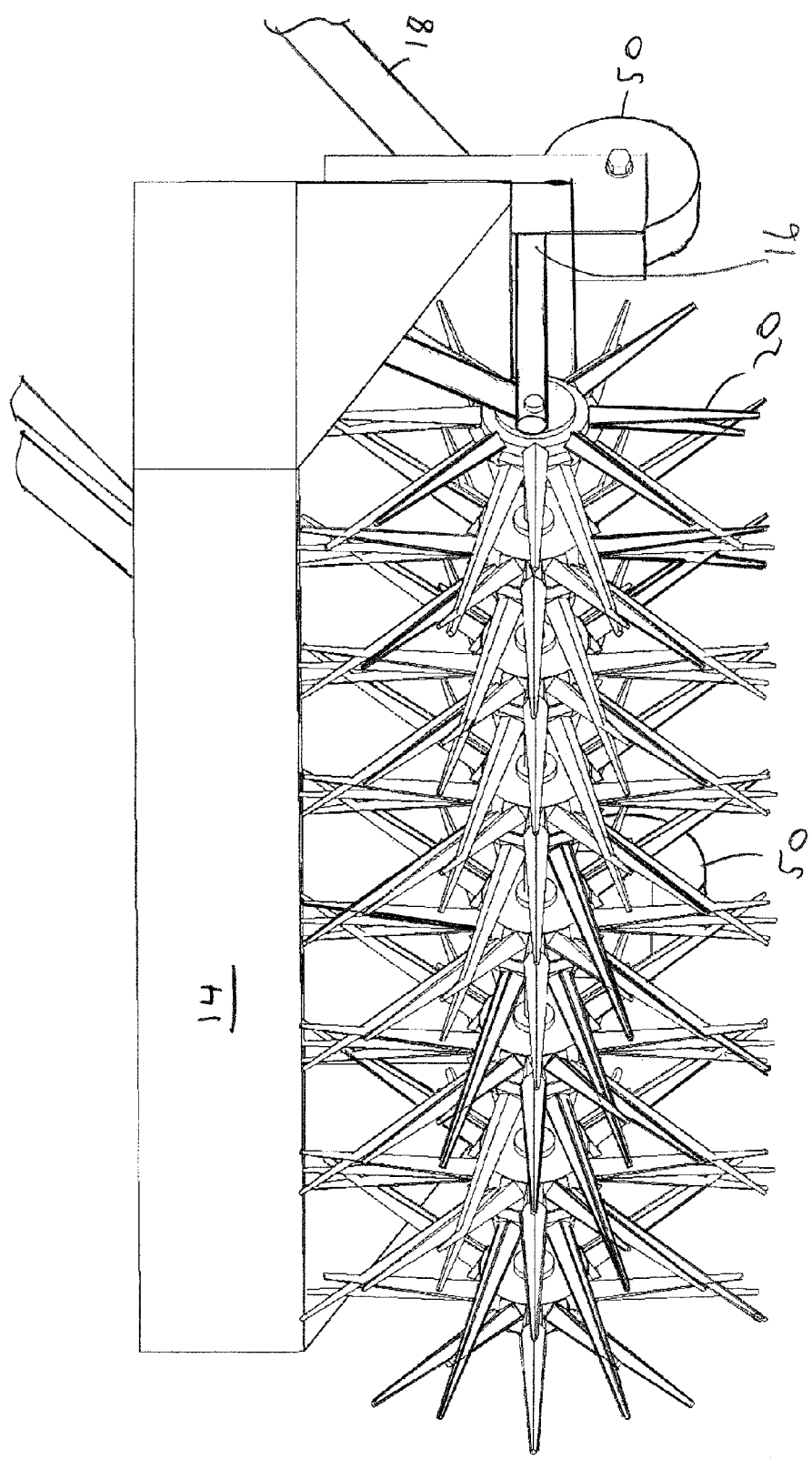
FIG. 4 is a front perspective view of an aerating assembly.
Figure 5:
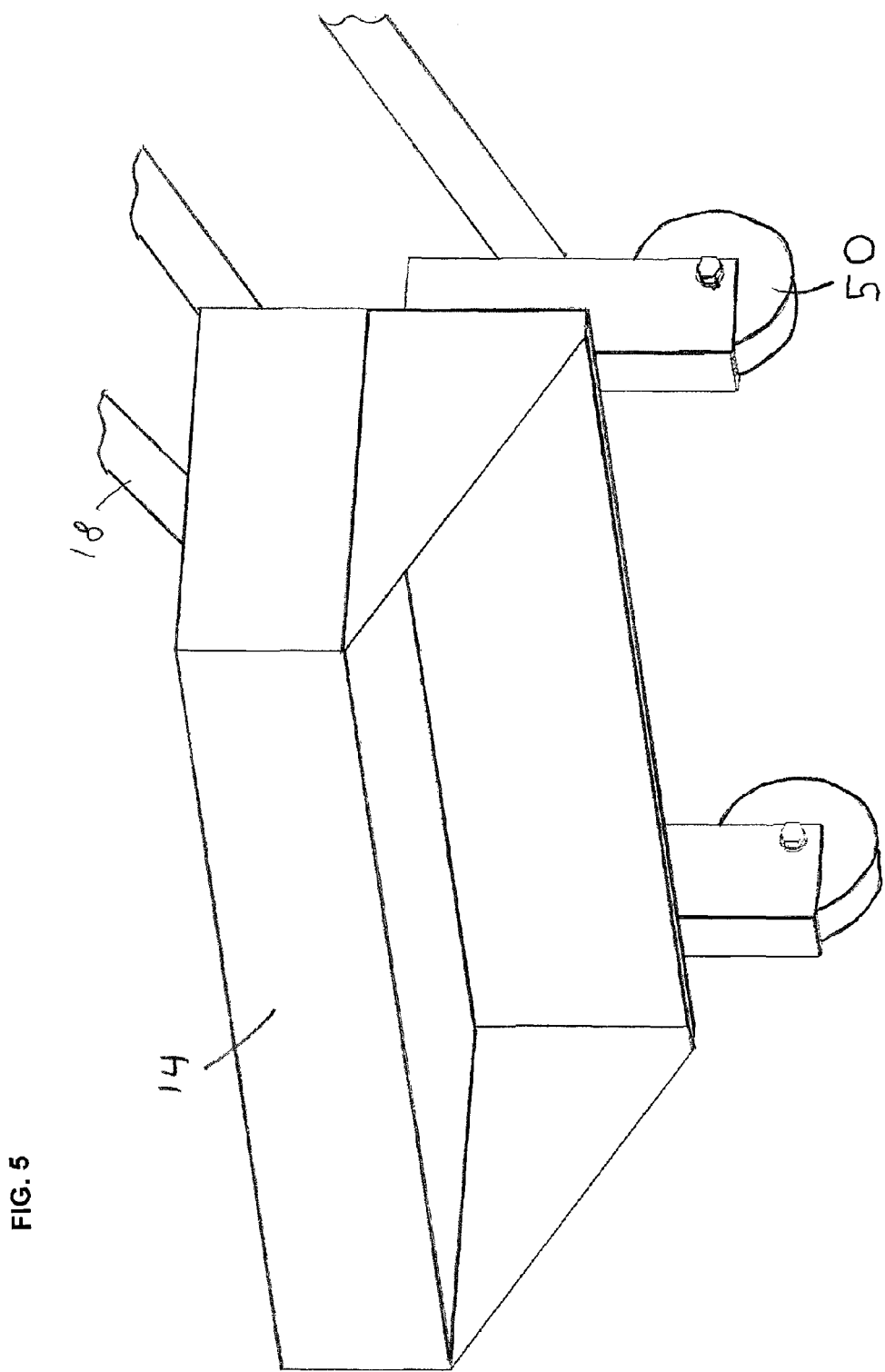
FIG. 5 is a front perspective view of a housing of the aerating assembly.
Figure 6:
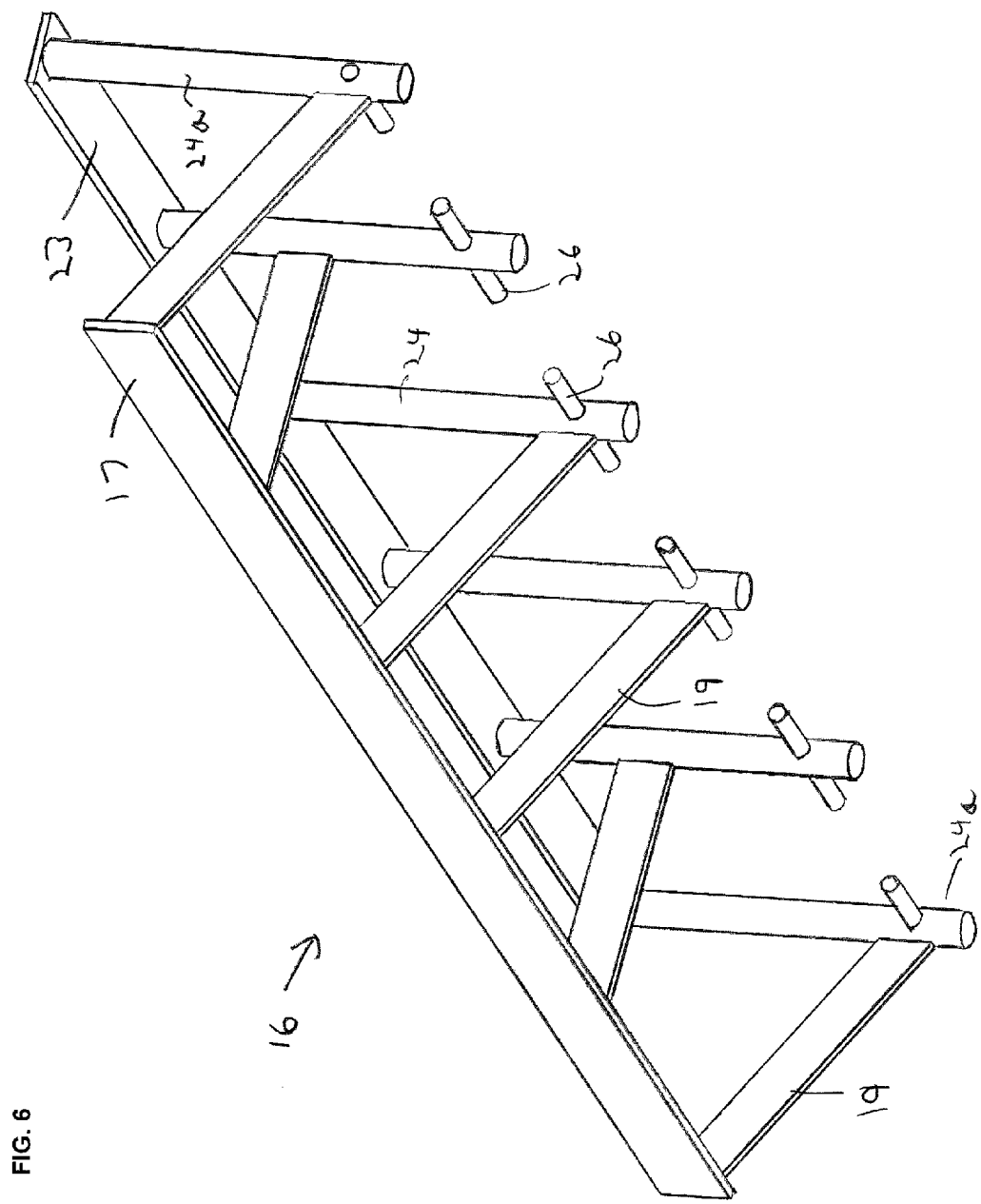
FIG. 6 is rear a perspective view of the frame.
Figure 6A:
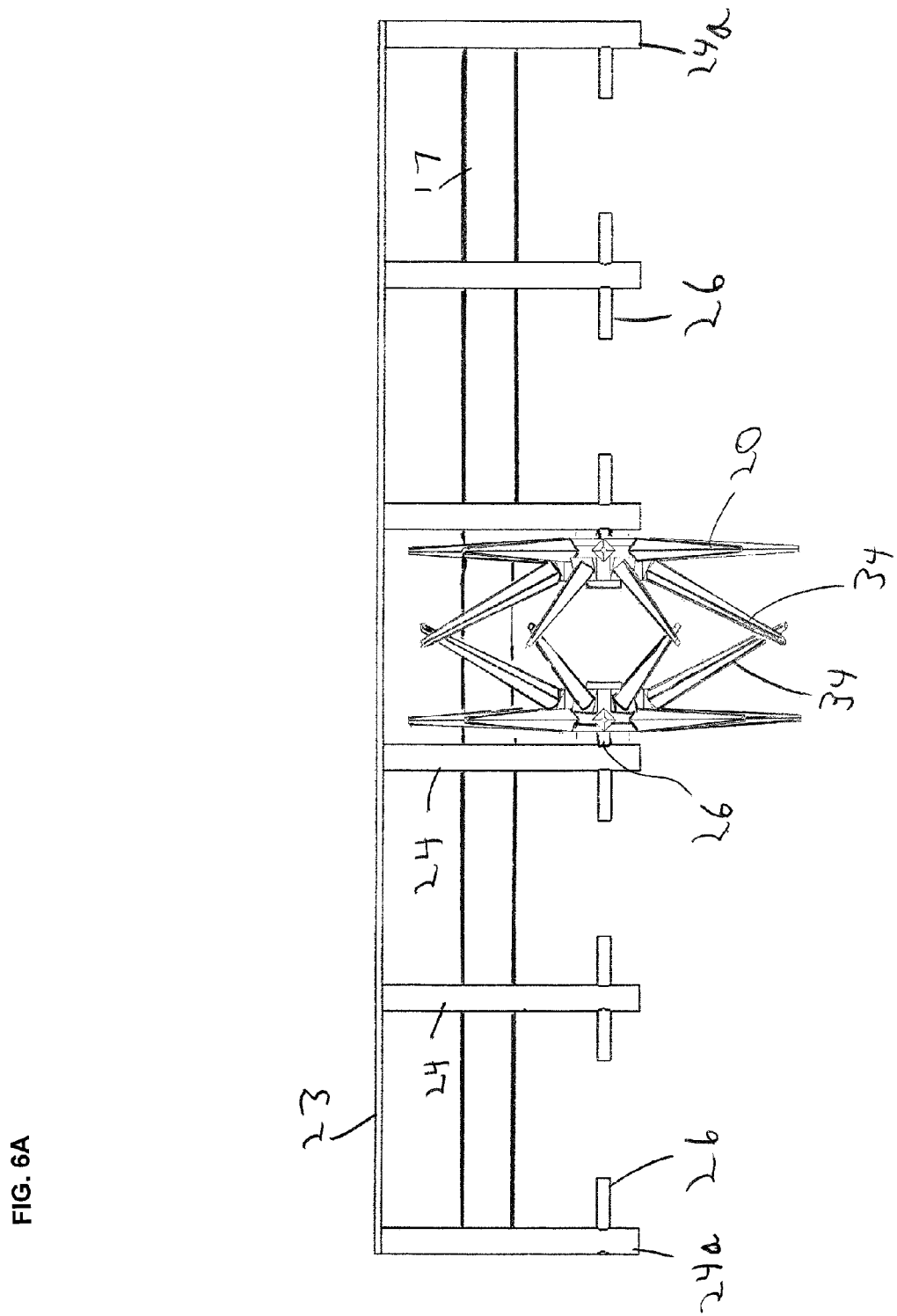
FIG. 6A is a front elevational view of the frame showing a pair of facing tine members.

With reference to FIGS. 1-3, a manually operated lawn aerating and dethatching device 10 is shown. The aerating and dethatching device 10 includes an aerating assembly 12 including a housing 14 including a frame 16 secured thereto. A handle assembly 18 extends outwardly from the aerating assembly 12 to permit a user to operate the device 10.

With further reference to FIGS. 4-6A, the frame 16 includes a plurality of tine members 20 rotatably secured thereto. A user operates the aerating and dethatching device 10 in order to bring the tines members 20 into engagement with the ground surface 22 to aerate and/or dethatch the soil. The frame 16 includes an elongate member 23 having a plurality of spaced ridged posts 24 extending therefrom in a generally orthogonal direction. The member 23 may be attached to the top of the housing 14. The posts 24 each include one or more axles 26 extending therefrom. The tine members 20 are rotatably secured on the axles 26. In a preferred embodiment, the end posts 24a include a single axle 26a extending toward a center of the frame for supporting a single tine member 20. The posts 24 disposed between the end posts 24a preferably include a pair of axles 26 extending outwardly from an end of the post. These axles each include a tine member 20 thereon. Accordingly, the frame 16 can accommodate a plurality of tine members. In the preferred embodiment, six posts are shown in FIG. 1; however, it is within the contemplation of the present invention that the frame may include more or less posts. In a preferred embodiment, the frame 16 may also include an elongate rigid portion 17 from which brackets 19 extend outwardly therefrom and are rigidly secured to the posts 24. The portion 17 may be attached to the back of the housing 14 and in mechanical communication with the handle 18. Rigid portion 17 helps to prevent the posts 24 from flexing upwardly when the tines members 20 are downwardly forced into engagement with the ground surface 22 by the user. The frame 16 may be a unitary rigid structure formed or metal such as steel or aluminum.

Figure 7:
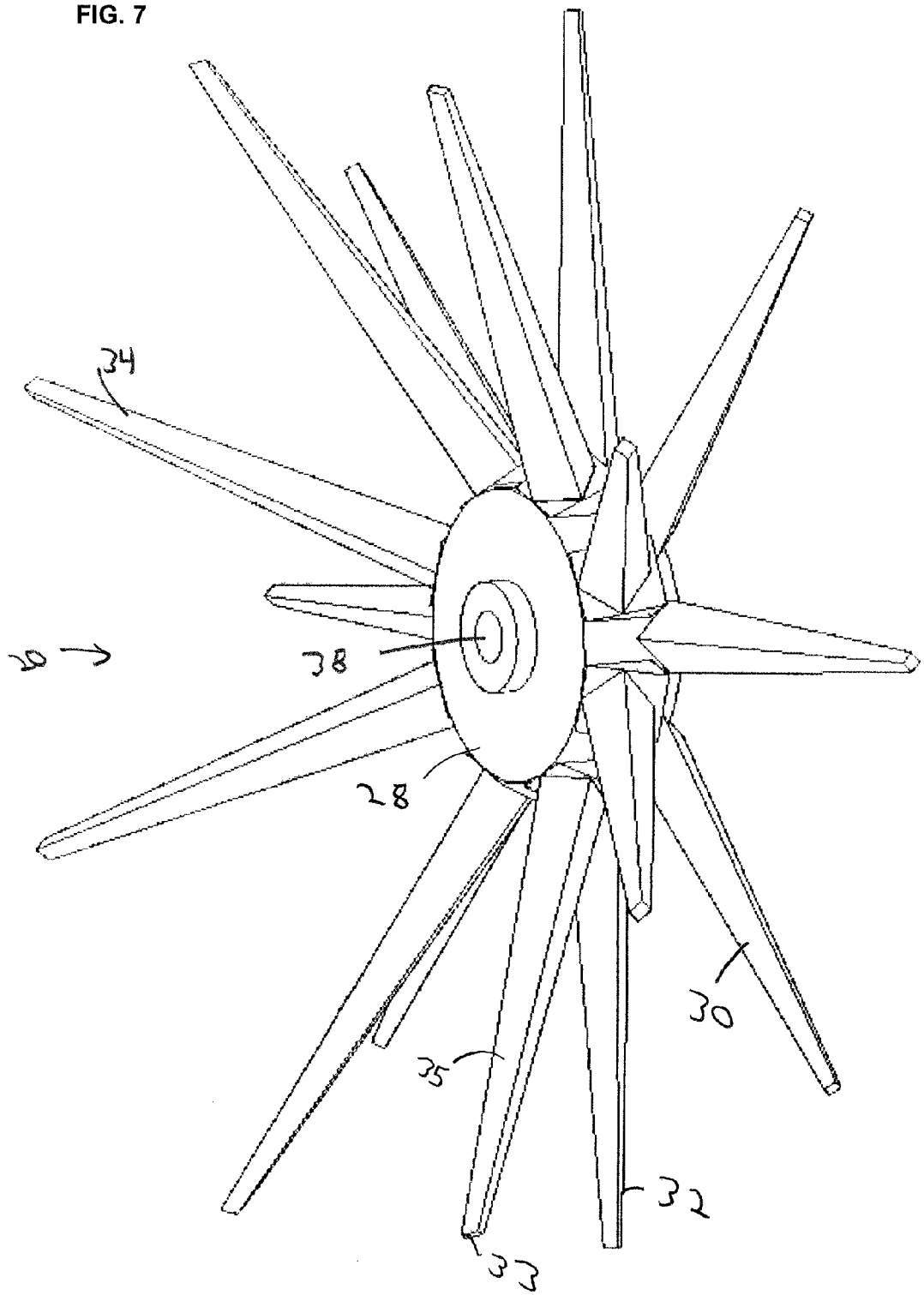
FIG. 7 is a perspective view of a tine member.
Figure 8:
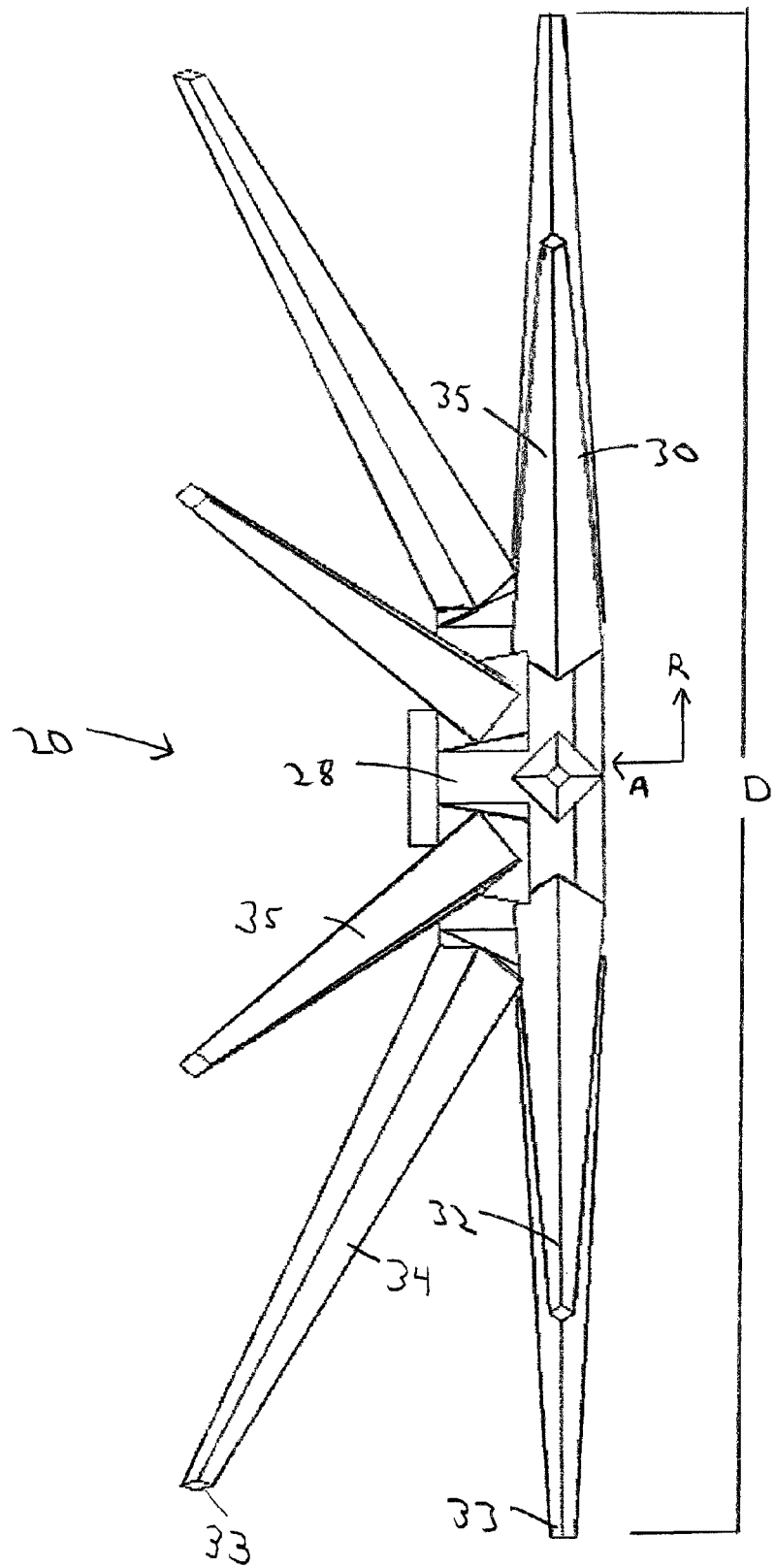
FIG. 8 is a side elevational view of the tine member.

With additional reference to FIGS. 7 and 8, the tine members 20 include a hub 28 with a plurality of elongate tines 30 extending therefrom. The plurality of tines 30 include a first and second set of tines 32 and 34, respectively. The first set of tines 32 are annularly spaced around the hub 28 and extend substantially in a radial direction R. The second set of tines are annularly spaced on the hub 28 and extend outwardly at an angle to the hub in a direction having both a radial R and axial A component. Each of the tines 30 taper as they extend toward a distal end to form a ground engaging point 33. The individual tines 30 may include relatively flat surfaces that meet in corners to form the side surfaces 35 of the tines. The tine members 20 may be formed of a cast or forged metallic material such as steel or aluminum or other suitable rigid material.

The tine members 20 have a diameter D which is defined as the distance from the point 33 of one of the first set of tines to a point 33 of another one of the first set of tines offset generally 180 degrees from the other. The hub 28 includes an opening 38 extending axially therethrough in order to receive an axle 26 attached to the post. The tine members 20 may be rotatably secured to the axle 26 by way of a pin or other fastening device as known in the art. As shown in FIG. 2, when the tine members 20 are installed on the axle 26, opposed tine 20 members on opposed axles will face each other. Accordingly, the second set of tines 34 on one tine member 20 which are extending to some degree in the axial direction tend to overlap the second set of tines on the opposed tine member 20. Accordingly, the space S between opposed adjacent tine members 20 is covered by the ground engaging tines. Therefore, when the aerating device 10 is used, there are no gaps between the tines that are left so that the ground surface 22 beneath the aerating assembly can be fully aerated and/or dethatched.

The tines members 20 are partially covered by the housing 14 which extends generally above the top of the frame 16 and the sides thereof. The front and bottom portions of the aerating assembly are left open in order to allow the tines 30 to engage the ground surface 22 and also to permit access by a user to clean the tines from dirt, grass particles or other debris that may get collected in the tines during the aerating process.

With reference to FIG. 1, a housing upper portion 42 includes a substantially flat surface 44 forming a support surface adapted to receive one or more weights 46 thereon. The weights may be added or removed by the user in order to assist in forcing the tines 30 into engagement with the ground surface 22. In one embodiment, the weights may include liquid filled containers. For example, the user may fill one of the containers with water and then insert it onto the support surface. Alternatively, the weights may include bricks, rocks, sand, or other heavy material. Straps 48 may be provided in order to secure the weights 46 onto the support surface 44. Depending on the condition of the soil, specifically how compacted the soil is, more or less weights may be needed. In soft soil, too much weight may cause the tines 30 to over engage which would make the aerating device 10 difficult to move and could unduly disturb the soil. In such a situation, the user may remove some of the weights in order to obtain a desirable degree of aeration. The upper support surface 44 may be divided into more than one compartment 44a, 44b having upward extending walls 45 such that the weights 46 may be placed within the compartments and retained therein.

Figure 9:
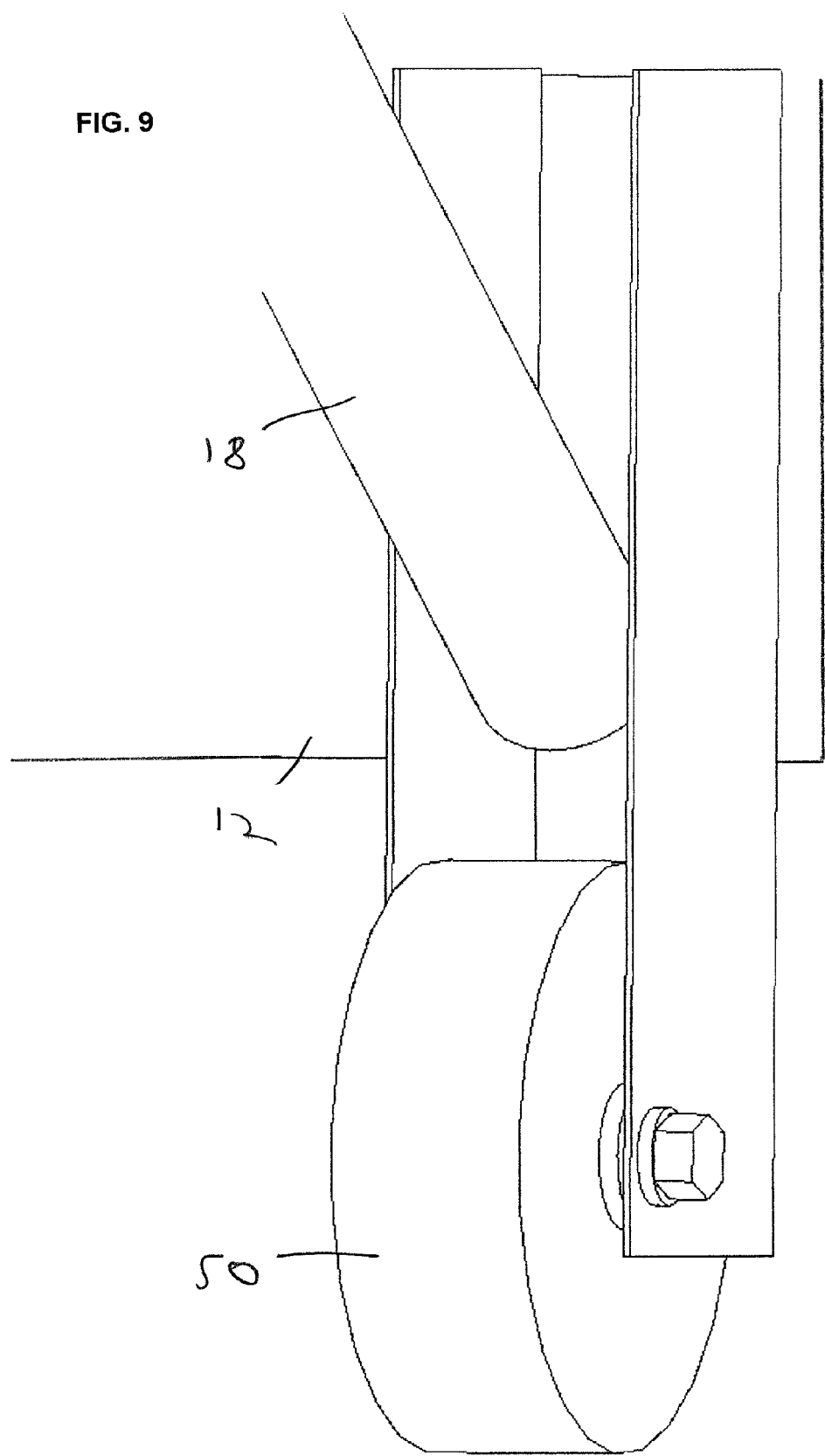
FIG. 9 is a detail perspective view of a wheel of the aerating assembly.

With reference to FIGS. 3 and 9, the aerating assembly 12 further includes a pair of wheels 50 rotatably secured thereto. The wheels 50 may be attached to the aerating assembly 12 such that they extend below the housing. The wheels have a circumference 52 which is offset from the circumference 54 of the plurality of tines as shown in FIG. 3. The wheels 50 may be used as a fulcrum to permit a user to pivot the tines 30 into and out of engagement with the ground surface 22. The wheels 50 are disposed between the plurality of tine members 20 and the handle assembly 18. Accordingly, one may engage the handle assembly 18 to pivot the tines of the aeration assembly into and out of engagement with the ground surface.

With reference to FIG. 1, the handle assembly 18 is securely fastened to the aerating assembly 12 and extends from the back of the assembly in a generally upwardly direction. The handle assembly 18 may include first and second elongate members, 56 and 58 respectively, having a first end attached adjacent to the wheels. The second ends of the elongate members may be joined together in a curved arcuate manner forming a handle 60 that may be gripped by a user. The handle assembly 18 may include a third elongate member 62 that extends from a center portion of the handle 60 to a central portion of the aerating assembly 12 and be secured thereto. Attachment points of the first and second members 64 and the attachment point of the third elongate member 66 are offset from each other in order to permit the handle assembly 18 to properly exert force on the aerating assembly. The third elongate member also provides reinforcement to the curved handle 60. The handle 20 may have width W that permits a user to place their hands fully around the handle on either side of the third member 62. This feature provides a user with the ability to better control and operate the device.

As shown in FIG. 3, the diameter of the tine members 20 is greater than the diameter of the wheels 50. Accordingly, when a user wishes to place the tines 30 into engagement with the ground surface 22, the handle 60 may be lifted in an upwardly direction which lifts the wheels off the ground and places the tines 30 into engagement with the ground surface. In this position, the user may move the aerating device 10 back and forth with the tines engaging and entering the ground, thereby aerating same. The engagement of the tines with the ground will also dislodge thatch that may be present. Engagement of the tine members, and in particular the first and second set of tines, ensures that the ground surface underneath the aerating assembly is fully and properly operated upon and conditioned, i.e., aerated and/or dethatched.

Figure 10:
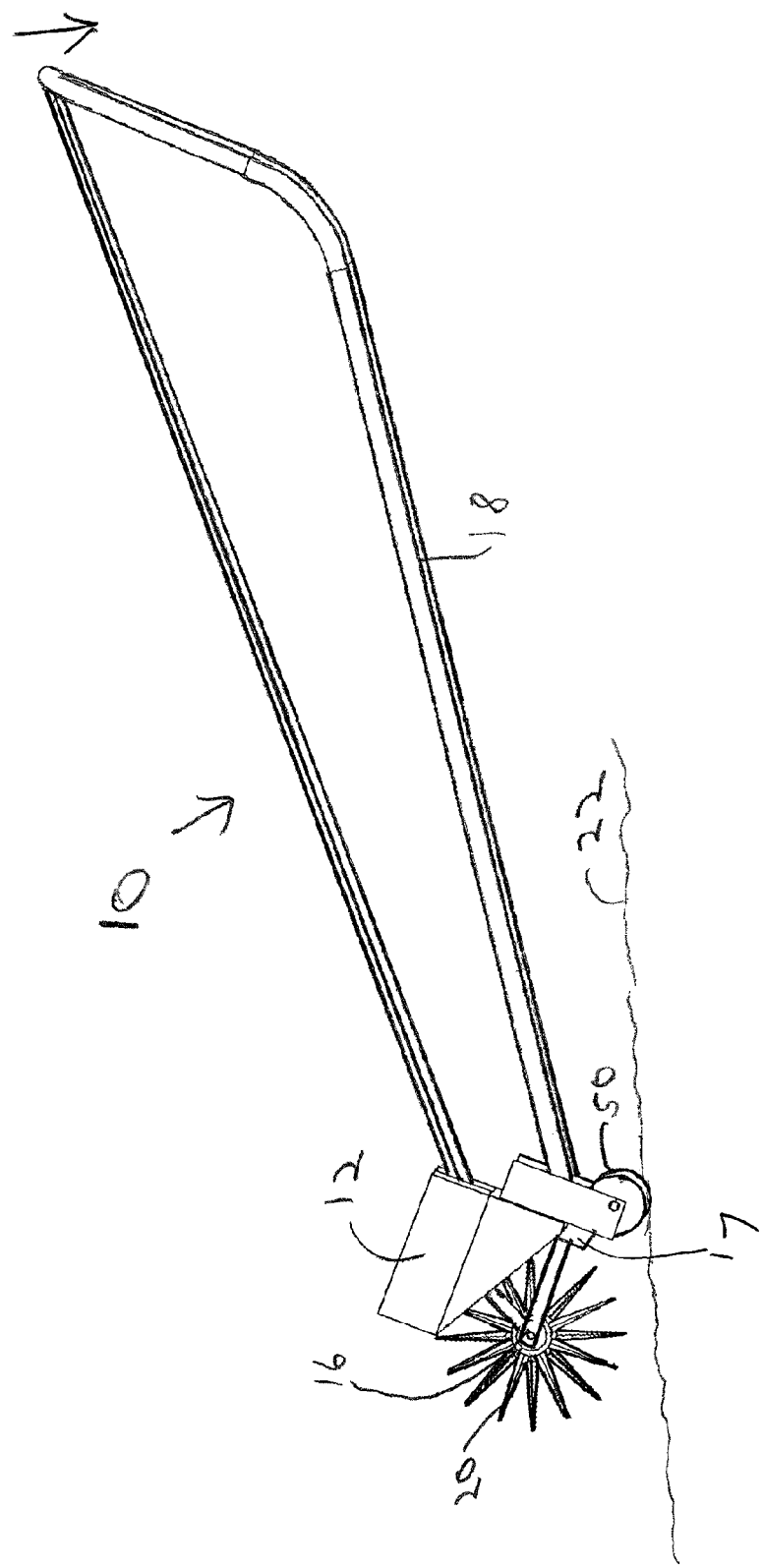
FIG. 10 is a side view of the aerator of FIG. 1 showing the aerating and dethatching device pivoted on the wheels to lift the tine members away from and out of engagement with the ground surface.

If less engagement of the tines 30 into the ground surface is desired, the user may move the handle in a downward position wherein the wheels engage the ground and the tines are pivoted upwardly as shown in FIG. 10. The user may now move the device over the ground surface 22 with the weight of the aerating device 10 being supported in part by the wheels 50 and in part by the tines 30. In this position, less weight is exerted on the tines causing a lesser degree of ground engagement. If the user wishes to fully engage the tines with the ground, they may lift the handle upwardly lifting the wheels off the ground such that any weight, including that from weights 46 placed on the housing 40, is fully acting on the tines since the wheels are off the ground. In addition, a user may also exert their own downward force along the handle to push the tines 30 into the ground. A component of the user's force acting along the handle may also be used to move the aerating and dethatching device 10 back and forth over the ground surface 22.

In operation, a user desiring to improve the soil condition of a particular area by aerating and/or dethatching it may engage the aerating and dethatching device 10. In order to easily transport the aerating device 10 to the area in need of aeration/and or dethatching, the user may rotate the handle 60 downwardly wherein the wheels engage the ground and further pivots the handle downwardly on the wheels to lift the tines 30 completely off the ground. The aerating and dethatching device 10 may now be rolled freely to the desired area. The user may add or remove any desired weights 46 to the top flat surface 44 of the housing in order to obtain the desired level of aeration and ground engagement. In order to begin aerating and/or dethatching, the user may pivot the handle 60 upwardly to lower the tines 30 into contact with the ground. As shown in FIG. 10, the user may further lift up the handle 60 to raise the wheels 50 off the ground such that all the weight is acting on the tines 30. The user may then move the device back and forth in order to aerate, dethatch, or otherwise condition the ground surface. The action of the opposed and overlapping second set of tines 34 and the first set of tines 32 extending in the axial direction work together to fully and completely aerate and loosen the soil. If thatch is present, the back and forth action of the device 10 also acts to detach the lawn. In order further increase the force of the tines acting on the ground surface, a user may pivot the handle 60 up even further and push downwardly along the direction of the handle. This results in a component of the force generated by the user being applied downwardly to force the tines down into the ground. Since the handle is still at an angle, a component of the force applied by the user also moves the aerating and dethatching device 10 either forward or backward depending on the direction of the force. When the aeration and/or dethatching is complete, the user may pivot the handle 60 downwardly so that the wheels 50 engage the ground and the tines 30 are lifted upwardly off the ground. The user may then roll the aerating and dethatching device 10 to another area to be worked on or back into storage.

It will be appreciated that various of the above-disclosed and other features and functions, or alternatives thereof, may be desirably combined into many other different systems or applications. It will also be appreciated that various presently unforeseen or unanticipated alternatives, modifications, variations, or improvements therein may be subsequently made by those skilled in the art which are also intended to be encompassed by the disclosed embodiments and the following claims.

What is claimed is:

1. A manually operated aerating and dethatching device comprising:
    a housing including a frame, the frame includes a plurality of posts extending therefrom;
    a plurality of tine members rotatably connected to the frame, each of the posts including a pair of tine members thereon, each tine member including a plurality of outwardly extending tines for engaging a ground surface, the tine members being generally aligned along a longitudinal axis, the tine members include a hub with the plurality of tines extending therefrom, the plurality of tines including a first and a second sets of tines, the first set of tines are annularly spaced about the hub and extend substantially in a radial direction, the second set of tines are annularly spaced on the hub and extend in a direction both radially and axially therefrom, and wherein the second set of tines of adjacently positioned tine members extend toward each other and cross each other;
    a first wheel rotatably connected to the housing, the first wheel having an outer rolling surface offset from an outer end of the plurality of tine members;
    a handle rigidly connected to the housing extending generally outwardly and upwardly therefrom, wherein movement of the handle in an upward direction pivots the housing on the first wheel to move the tine members into engagement with the ground surface wherein a degree of engagement of the tine members with the ground surface can be controlled by the user.

2. The device as defined in claim 1, wherein the pair of tine members is disposed on the post such that the first set of tines is adjacent to each other.

3. The device as defined in claim 1, wherein the tines narrow as they extend from the hub to form a point for forming holes in the ground surface.

4. The device as defined in claim 1, wherein the housing includes a support surface disposed above the plurality of tine members, the support surface adapted to receive one or more weights thereon.

5. The device as defined in claim 1, wherein the posts each include an axle extending therefrom for supporting the hub of a tine member and the posts each include a rigid bracket extending from the post to a rigid portion of the frame to resist flexing of the posts when the plurality of tine members are moved into engagement with the ground.

6. The device as defined in claim 1, further including a second wheel rotatably connected to the housing, the first and second wheels forming a fulcrum for allowing a user to increase or decrease tine member engagement with the ground surface upon movement of the handle.

7. The device as defined in claim 1, wherein the handle includes a pair of elongate members each having a first end secured to the frame and a second end extending upwardly and joining each other to form an upper handle portion.

8. The device as defined in claim 7, wherein the handle includes a third elongate member disposed between the pair of elongate members, the third elongate member having a first end connected to the frame and a second end connected to the upper handle portion.

9. The device as defined in claim 6, wherein the first and second wheel have a diameter less than the diameter of the tine members.

10. A ground aerating and dethatching device for conditioning a ground surface comprising:
   an aerating assembly including a frame having a housing secured thereto, the frame having a plurality of spaced posts extending therefrom;
   a plurality of tine members offset from each other in an axial direction and rotatably securable to the posts, each of the tine members having a first set of tines and a second set of tines extending from a common hub, the second set of tines of adjacently opposed tine members overlapping each other in the axial direction;
   a pair of spaced wheels rotatably secured to the aerating assembly;
   a handle assembly connected to and extending from the aerating assembly; and
   the wheels being disposed between the tine members and the handle, the aerating assembly being pivotable on the wheels upon movement of the handle to selectively engage the tines with the ground surface.

11. The device as defined in claim 10, wherein the plurality of tine members include a plurality of tine member sets each including two tine members, the two tine members of each tine member set having a plurality of tines overlapping each other, and the tines members of one set not overlapping the tine members of another set.

12. The device as defined in claim 10, wherein the handle assembly is connected to and extending from the aerating assembly, the handle assembly including first and second substantially straight elongate members each having a first end attached to the aerating assembly adjacent to the wheels, and an opposed second end joined together by a curved arcuate portion forming a handle adapted to be gripped by a user, the handle assembly including a third substantially straight elongate member having a first end attached to the aerating assembly and a second end attached to the curved arcuate portion, the second end of the third elongate member is offset from the second ends of the first and second elongate members in a direction generally perpendicular to a longitudinal axis of the third member.

13. The device as defined in claim 10, wherein the first set of tines extends outwardly from the hub in a generally radial direction.

14. The device as defined in claim 13, wherein the second set of tines extends outwardly from the hub at an angle to the hub having an axial and radial component.

15. The device as defined in claim 10, wherein the diameter of the wheels is less than the diameter of the tine members.

16. The device as defined in claim 15, wherein an axis of rotation of the wheels is offset from an axis of rotation of the tine members.

17. The device as defined in claim 16, wherein the handle assembly is non-rotatably secured to the aerating assembly.

18. A method of aerating and dethatching a ground surface comprising:
   providing an aerating and dethatching device including a housing including a frame;
   a plurality of tine members rotatably connected to the frame, each tine member including a plurality of outwardly extending tines for engaging a ground surface, the tine members being generally aligned along a longitudinal axis;
   a first wheel rotatably connected to the housing, the first wheel having an outer rolling surface offset from an outer end of the plurality of tine members;
   a handle rigidly connected to the housing extending generally outwardly and upwardly therefrom, wherein movement of the handle in an upward direction pivots the tine members on the wheel into engagement with the ground surface wherein a degree of engagement of the tine members with the ground surface can be controlled by the user;
   rotating the handle upwardly to lift the first wheel upwardly off the ground to engage the tines with the ground surface;
   manually moving the aerating and dethatching device forward and backward over the ground surface with the first wheel raised above the ground; and
   adjusting the amount of force acting on the tines by pivoting the handle up and down.

19. The method as defined in claim 18, further including pivoting the handle downwardly to pivot the aerating device on the first wheel wherein the tine members are lifted out of engagement with the ground surface and wherein the aerating device may be freely rolled on the first wheel without the tines engaging the ground surface.

* * * * *